United States Patent
Singh et al.

(10) Patent No.: US 11,589,514 B2
(45) Date of Patent: Feb. 28, 2023

(54) PICKUP DRIVE SYSTEM FOR AN AGRICULTURAL BALER

(71) Applicant: CNH Industrial America LLC, New Holland, PA (US)

(72) Inventors: Chandrashekhar K. Singh, Lancaster, PA (US); John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 680 days.

(21) Appl. No.: 16/669,133

(22) Filed: Oct. 30, 2019

(65) Prior Publication Data

US 2021/0127580 A1    May 6, 2021

(51) Int. Cl.
*A01D 89/00*     (2006.01)
*A01D 75/18*     (2006.01)
(Continued)

(52) U.S. Cl.
CPC .......... *A01D 89/005* (2013.01); *A01D 69/08* (2013.01); *A01D 75/182* (2013.01); *A01D 89/002* (2013.01); *B60W 10/02* (2013.01); *A01F 15/0715* (2013.01); *A01F 15/085* (2013.01); *A01F 15/0833* (2013.01); *A01F 15/0841* (2013.01); *A01F 15/106* (2013.01);
(Continued)

(58) Field of Classification Search
CPC ..... F16H 2007/0893; F16H 2007/0865; F16H 2007/0806; F16H 7/1281; F16D 13/75; F16D 13/40; F16D 7/025; B60W 10/02; B30B 9/305; B30B 9/3082; A10F 15/106; A10F 15/085; A10F 15/0841; A10F 15/0833; A10F 15/0715; A01D 89/005; A01D 89/002; A01D 75/182; A01D 69/08
See application file for complete search history.

(56) References Cited

U.S. PATENT DOCUMENTS 2,732,678 A    1/1956  Blaser et al.
4,520,681 A    6/1985  Moore et al.
(Continued)

FOREIGN PATENT DOCUMENTS

CN    204186838 U    3/2015
CN    205726897 U    11/2016
(Continued)

OTHER PUBLICATIONS

Extended European Search Report for EP Application No. 20204615.7 dated Mar. 26, 2021 (six pages).

*Primary Examiner* — Arpad F Kovacs
(74) *Attorney, Agent, or Firm* — Peter Zacharias; Patrick Sheldrake (57) ABSTRACT

A pickup unit of an agricultural baler that includes a reel with a plurality of tines configured for lifting a crop material from a field, the reel is rotatable in an operating direction and a reverse direction, and a drive system configured for driving the reel. The drive system includes a gearbox configured for receiving motive power from a power take off (PTO) shaft, a drive shaft operably connected to the gearbox, and a first clutch connected to the drive shaft. The first clutch is configured for operably disconnecting motive power to the reel so that the reel is manually rotatable as the PTO shaft remains operably engaged with the gearbox.

20 Claims, 6 Drawing Sheets

(51) Int. Cl.
- *A01D 69/08* (2006.01)
- *B60W 10/02* (2006.01)
- *A01F 15/08* (2006.01)
- *A01F 15/10* (2006.01)
- *F16D 13/40* (2006.01)
- *F16H 7/08* (2006.01)
- *F16D 13/76* (2006.01)
- *F16D 7/02* (2006.01)
- *F16H 7/12* (2006.01)
- *B30B 9/30* (2006.01)
- *A01F 15/07* (2006.01)

(52) U.S. Cl.
CPC ............ *B30B 9/305* (2013.01); *B30B 9/3082* (2013.01); *F16D 7/025* (2013.01); *F16D 13/40* (2013.01); *F16D 13/76* (2013.01); *F16H 7/1281* (2013.01); *F16H 2007/0806* (2013.01); *F16H 2007/0865* (2013.01); *F16H 2007/0893* (2013.01)

(56) References Cited

U.S. PATENT DOCUMENTS

| | | | |
|---|---|---|---|
| 6,073,426 A | 6/2000 | Mesmer et al. | |
| 6,233,913 B1 | 5/2001 | Roth et al. | |
| 6,644,005 B1 | 11/2003 | Grahl et al. | |
| 6,644,006 B1 * | 11/2003 | Merritt | A01F 15/106 |
| | | | 56/11.2 |
| 6,701,834 B2 | 3/2004 | Roth | |
| 6,925,788 B2 * | 8/2005 | Nelson | A01F 15/085 |
| | | | 56/11.2 |
| 6,928,792 B1 | 8/2005 | Viesselmann et al. | |
| 7,669,400 B2 * | 3/2010 | Naaktgeboren | A01F 15/0841 |
| | | | 56/341 |
| 7,942,599 B2 * | 5/2011 | Naaktgeboren | A01F 15/0841 |
| | | | 464/33 |
| 8,113,114 B2 | 2/2012 | Schlesser et al. | |
| 8,311,709 B2 | 11/2012 | Vanhercke et al. | |
| 8,544,243 B2 | 10/2013 | Herron et al. | |
| 8,577,559 B2 | 11/2013 | Hel et al. | |
| 2006/0242937 A1 | 11/2006 | Pourchet et al. | |
| 2016/0235007 A1 * | 8/2016 | Hoffmann | A01F 15/0715 |
| 2018/0242528 A1 | 8/2018 | Rodewald | |
| 2019/0055993 A1 | 2/2019 | Pautz | |

FOREIGN PATENT DOCUMENTS

| | | | | |
|---|---|---|---|---|
| DE | 2529639 A1 | 3/1976 | | |
| DE | 29601671 U1 | 4/1996 | | |
| DE | 195 38 370 | 10/1996 | | |
| DE | 202006018873 U1 | 5/2007 | | |
| EP | 1205102 A2 * | 5/2002 | ........... | A01F 15/071 |
| EP | 1228682 A2 * | 8/2002 | ........... | A01F 15/085 |
| EP | 1293117 A1 | 3/2003 | | |
| EP | 2 225 926 A1 | 9/2010 | | |
| EP | 2982235 B1 * | 8/2017 | ......... | A01F 15/0715 |
| EP | 3366110 A1 * | 8/2018 | ......... | A01F 15/0715 |
| EP | 3479674 A1 | 5/2019 | | |
| WO | WO-2013057114 A1 * | 4/2013 | ......... | A01F 15/0841 |
| WO | 2013/124836 A1 | 8/2013 | | |
| WO | 2013/152991 A1 | 10/2013 | | |
| WO | WO-2015065173 A1 * | 5/2015 | ......... | A01F 15/0715 |

* cited by examiner

PICKUP DRIVE SYSTEM FOR AN AGRICULTURAL BALER

BACKGROUND OF THE INVENTION

The present invention pertains to agricultural balers and, more specifically, to a drive system for an agricultural baler.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The pickup unit of a round baler may include tine bars and multiple tines attached to the tine bars for picking up the crop material from the field. The pickup unit may also include a driveline that is operably connected in between the power take off (PTO) shaft of the tractor, or other agricultural vehicle, and the tine bars. Thus, the driveline transmits the power from the PTO shaft in order to rotate the tine bars and tines attached thereto.

To protect the pickup unit from damage during a torque overload, for example when a foreign object or a sudden and large accumulation of crop material enters the pickup unit, operating power to the pickup unit may be cut off. For instance, a pickup unit of a baler may additionally include a radial pin, shear bolt, or overrunning clutch configuration which operably disconnects the driveline of the pickup unit from the PTO shaft. Generally, once the pickup unit has stopped, the operator must remove the foreign object or jammed crop material. It may be time-consuming and arduous to reset or re-engage power to the pickup unit. For example, replacing shear bolts can be a time-consuming process. Furthermore, various concerns may arise if operating power is undesirably applied to the pickup unit when the operator is still in the midst of cleaning out or resetting the pickup unit. Hence, it may be desirable, and even required by some regulatory standards, to only re-engage operating power the pickup unit upon manual intervention by the operator.

What is needed in the art is a cost-effective and efficient drive system for protecting the pickup unit as well as the operator.

SUMMARY OF THE INVENTION

In one exemplary embodiment formed in accordance with the present invention, there is provided a drive system of a pickup unit of a baler. The drive system includes a gearbox configured for receiving motive power, a drive shaft operably connected to the gearbox, and a first clutch connected to the drive shaft. The first clutch may be a cutout clutch or a single clutch with a stopping pawl. The drive system may also include an overrunning clutch operably connected to the reel. The drive system disconnects motive power to the reel, as the PTO shaft remains operably engaged with the gearbox, so that the pickup unit is shut down during an overloading thereof and the operator may subsequently cleanout the pickup unit by rotating the reel in its operating or reverse directions without concern of the reel resetting.

In another exemplary embodiment formed in accordance with the present invention, there is provided a pickup unit of an agricultural baler that includes a reel with a plurality of tines configured for lifting a crop material from a field, the reel is rotatable in an operating direction and a reverse direction, and a drive system configured for driving the reel. The drive system includes a gearbox configured for engaging with and receiving motive power from a power take off (PTO) shaft of a towing vehicle for the agricultural baler, a drive shaft operably connected to the gearbox, and a first clutch connected to the drive shaft. The first clutch is configured for operably disconnecting motive power to the reel so that the reel is manually rotatable as the PTO shaft remains operably engaged with the gearbox.

In yet another exemplary embodiment formed in accordance with the present invention, there is provided an agricultural baler that includes a frame, a main bale chamber supported by the frame and configured for forming a bale, and a pickup unit located upstream of the main bale chamber. The pickup unit includes a reel with a plurality of tines configured for lifting a crop material from a field, the reel is rotatable in an operating direction and a reverse direction, and a drive system configured for driving the reel. The drive system includes a gearbox configured for engaging with and receiving motive power from a power take off (PTO) shaft of a towing vehicle for the agricultural baler, a drive shaft operably connected to the gearbox, and a first clutch connected to the drive shaft. The first clutch is configured for operably disconnecting motive power to the reel so that the reel is manually rotatable as the PTO shaft remains operably engaged with the gearbox.

One possible advantage of the exemplary embodiment of the agricultural baler is that the drive system shuts down the reel of the pickup unit if the reel becomes overloaded by an excess amount of crop material or a foreign object.

Another possible advantage of the exemplary embodiment of the agricultural baler is that the reel does not automatically re-engage without manual intervention of the operator, and thus the operator may rotate the reel in its operating direction without resetting the reel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
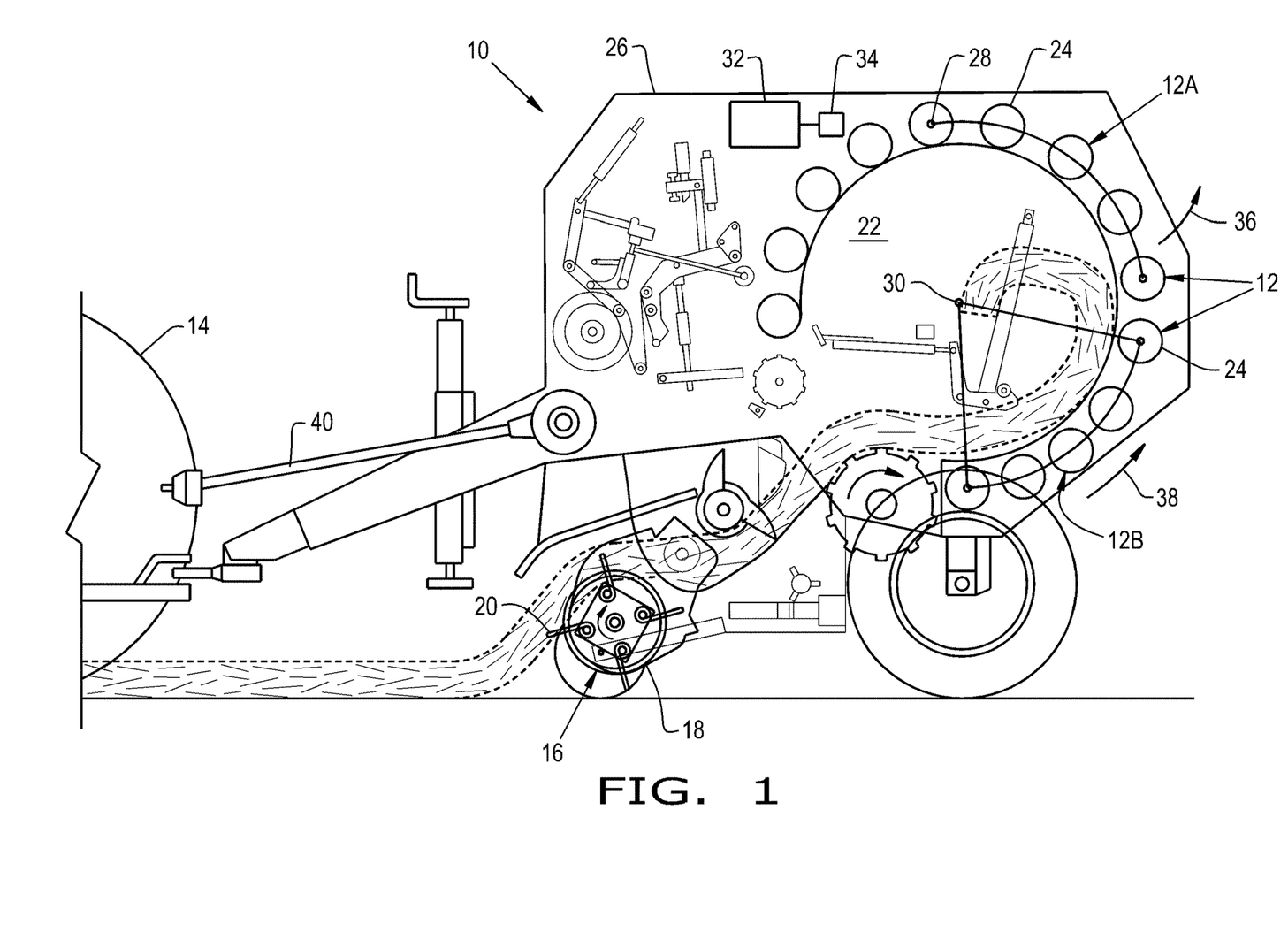
FIG. 1 illustrates a side cross-sectional view of an agricultural baler that has a pickup unit and a bale chamber, the pickup unit has a drive system, in accordance with an exemplary embodiment of the present invention.
Figure 2:
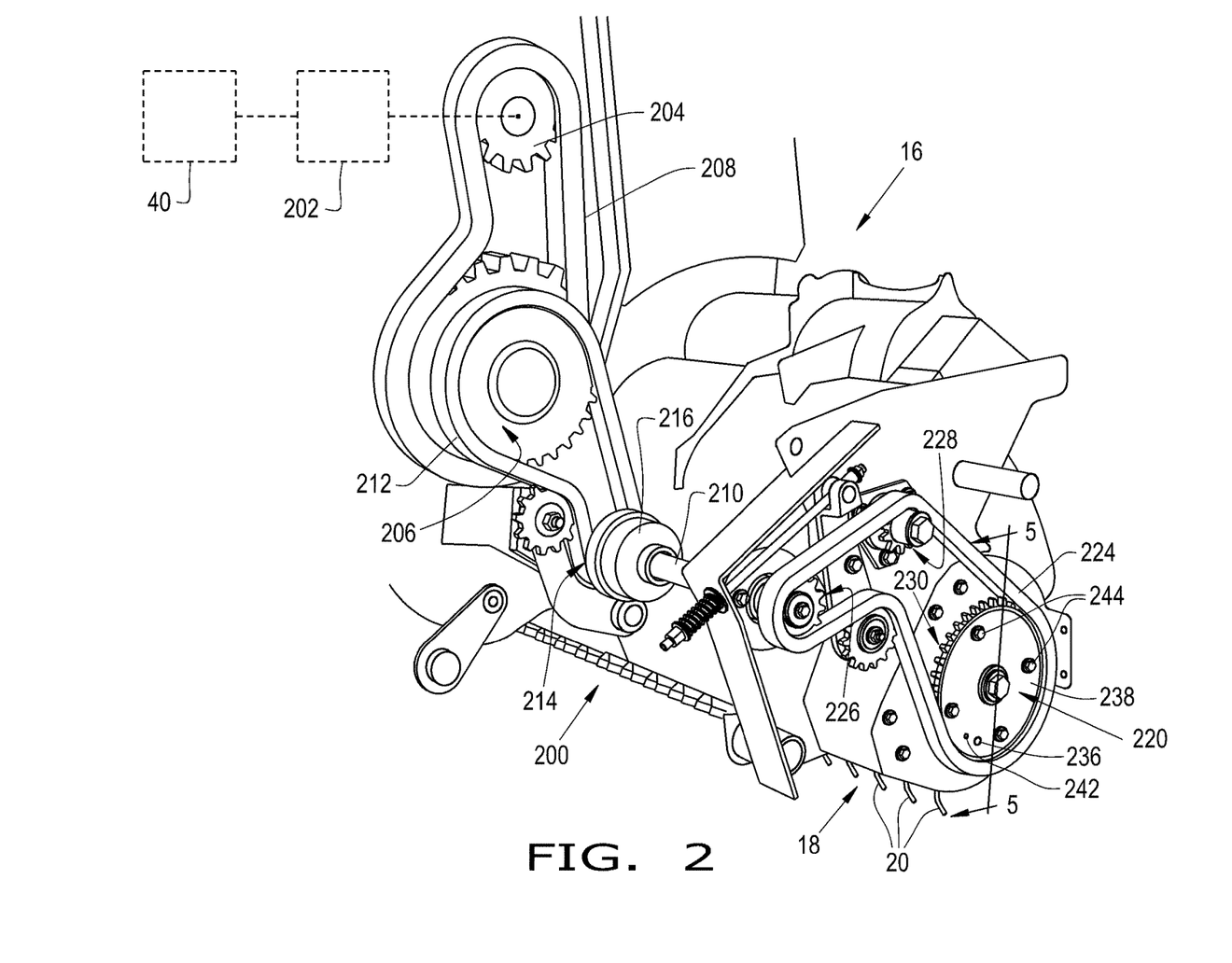
FIG. 2 illustrates a perspective view of the drive system of the pickup unit of the agricultural baler of FIG. 1, the drive system includes a one-way clutch and an overrunning clutch, in accordance with an exemplary embodiment of the present invention.

Referring now to the drawings, and more particularly to FIG. 1, there is shown a cross-sectional, side view of a round baler 10 which may be towed by an agricultural vehicle 14, such as a tractor 14. Alternatively, the round baler 10 may be a self-propelled baler.

Crop material is lifted from windrows into the baler 10 by a pickup unit 16. The pickup unit 16 includes a rotating pickup reel 18 with tine bars and tines 20, which move the crop rearward toward a bale chamber 22. The reel 18 is rotatable in an operating direction for lifting the crop material off of the ground and a reverse direction, i.e., opposite to the operating direction. In general, the crop material is rolled into a bale of a predetermined size within the bale chamber 22, and then is discharged through a tail gate arrangement 12 onto the field, where it is subsequently picked up for transport.

The bale chamber 22 is configured as an expandable bale chamber 22 with a plurality of carrier elements 24 carried by a frame 26. The carrier elements 24 are arranged in an arcuate arrangement around the bale chamber 22, and function to engage and roll the expanding bale as the crop material is fed into the bale chamber 22. In the illustrated embodiment, the carrier elements 24 are configured as rollers. However, the carrier elements can be variously formed, such as rollers, chains and slats, and/or belts.

The carrier elements 24 may be paired with an upper tail gate arrangement 12A and a lower tail gate arrangement 12B. The upper tail gate arrangement 12A has a first pivot axis 28, and the lower tail gate arrangement 12B has a second pivot axis 30. The upper and lower tail gate arrangements 12A, 12B may rotate to open the bale chamber 22 for accordingly allowing the wrapped bale to be ejected.

The agricultural baler 10 can further include an electrical processing circuit 32 which is configured for carrying out a bale discharge operation using the upper tail gate arrangement 12A and the lower tail gate arrangement 12B. The electrical processing circuit 32 can carry out the bale discharge operation, based on the following discharge sequence. The electrical processing circuit 32 may first sense a full bale condition within the bale chamber 22 using an appropriate sensor 34, corresponding to a predetermined size of the bale within the bale chamber 22. Then the upper tail gate arrangement 12A may be opened by pivoting the upper tail gate arrangement 12A about the first pivot axis 28 to an open position (in an upward direction, as shown by directional arrow 36 in FIG. 1). Next, the bale may be ejected by pivoting the lower tail gate arrangement 12B about the second pivot axis 30 to an eject position (counter-clockwise in an upward direction, as shown by directional arrow 38 in FIG. 1). It should be appreciated that the electrical processing circuit 32 is coupled with suitable actuators (not shown), which are in turn coupled with the upper tail gate arrangement 12A and the lower tail gate arrangement 12B, for pivoting the upper tail gate arrangement 12A and the lower tail gate arrangement 12B about their respective pivot axis 28, 30. The discharge sequence can further include the step of wrapping the bale with a wrapping material (e.g., mesh or twine), after the full bale condition is sensed and prior to opening the upper tail gate arrangement 12A. To further decrease the bale discharge time, the upper tail gate arrangement 12A can be opened when the wrapping step is partially completed. In particular, the upper tail gate arrangement 12A can be opened when the bale has been wrapped with at least one full revolution of wrapping material.

Referring now to FIGS. 2-5, there is shown a pickup drive system 200 for the pickup unit 16. The drive system 200 generally includes a gearbox 202 operably coupled to a power take off (PTO) shaft 40 of the agricultural vehicle 14, a starter roll 204, a rotor double sprocket 206 operably coupled to the starter roll 204 by a conveying member 208, e.g. belt or chain 208, and a pickup drive shaft 210 operably coupled to the rotor double sprocket 206 by a conveying member 212 and a left-end sprocket 214. The drive system 200 further includes a pickup clutch 216 and an overrunning clutch 220.

Upon an overloading of the pickup unit 16, for example when the pickup unit 16 receives an excess amount of crop material and/or a foreign object, such as a rock, which may plug, jam, or damage the pickup unit 16, the pickup clutch 216 may disengage motive power to the reel 18. The overrunning clutch 220 prevents re-engagement of the pickup clutch 216 so that the pickup drive shaft 210 may be rotated in the reverse direction. As can be appreciated, the PTO shaft 40 may still be running and thus motive power may still be provided to the gearbox 202. Yet, due to the combination of the pickup clutch 216 and the overrunning clutch 220, the operator may cleanout or unplug the reel 18 by removing crop material and/or rotating the reel 18 in its operating or reverse directions, without concern of a re-engagement of the reel 18. Thereby, the drive system 200 may dually stop the pickup unit 16 in the event of an overload and prevent the pickup unit 16 from resetting. The drive system 200 may only re-engage upon manual intervention by the operator. Hence, the drive system 200 may fulfill various safety desires or requirements, which may require that the pickup unit 16 cannot reset without manual intervention.

The gearbox 202 is operably coupled to and receives motive power from the PTO shaft 40 of the agricultural vehicle 14. The gearbox 202 may be in the form of any desired gearbox 202. The starter roll 204 may be operably connected to the gearbox 202. The starter roll 204 may have a "T" gearbox output which is operably connected to the rotor double sprocket 206 by the chain 208. The drive shaft 210 is operably connected to the rotor double sprocket 206 at its left end, by the left-end sprocket 214 and the chain 212, and to the reel 18 at its right end, by a right-end sprocket 226 and the chain 224. The chain 224 may also operably connect the drive shaft 210 to an auger drive 228. Hence, the drive shaft 210 is operably connected to and receives motive power from the gearbox 202 by way of the sprocket 214, rotor double sprocket 206, and the starter roll 204.

The pickup clutch 216 is connected to the drive shaft 210. The pickup clutch 216 may function to operably disconnect motive power to the reel 18 upon an overloading of the pickup unit 16. The pickup clutch 216 may also lower the re-engagement speed to be below the idle speed of the PTO shaft 40, for example below 80 revolutions per minute (rpm). The pickup clutch 216 may further allow motive power to flow in only one direction, e.g. from the rotor double sprocket 206 to the reel 18, such that the reel 18 can be manually rotated. For instance, the reel 18 may be manually rotated in the reverse direction without causing the pickup clutch 216 to re-engage. Yet, rotating the reel 18, at the pickup drive shaft 210, in the forward direction may nevertheless cause the pickup clutch 216 to re-engage. For example, when the pickup drive shaft 210 is rotated in the forward direction the resultant speed at the pickup clutch 216 may exceed 80 rpm, due to a speed ratio increase between the sprockets of the reel 18 and pickup drive shaft 210, which may then accordingly re-engage the pickup clutch 216 and reset the reel 18. The pickup clutch 216 may be in the form of a cutout clutch, such as a friction or ratchet clutch. It is conceivable to pair the pickup clutch 216 with an additional clutch on the pick up drive shaft 210 (not shown).

Figure 3:
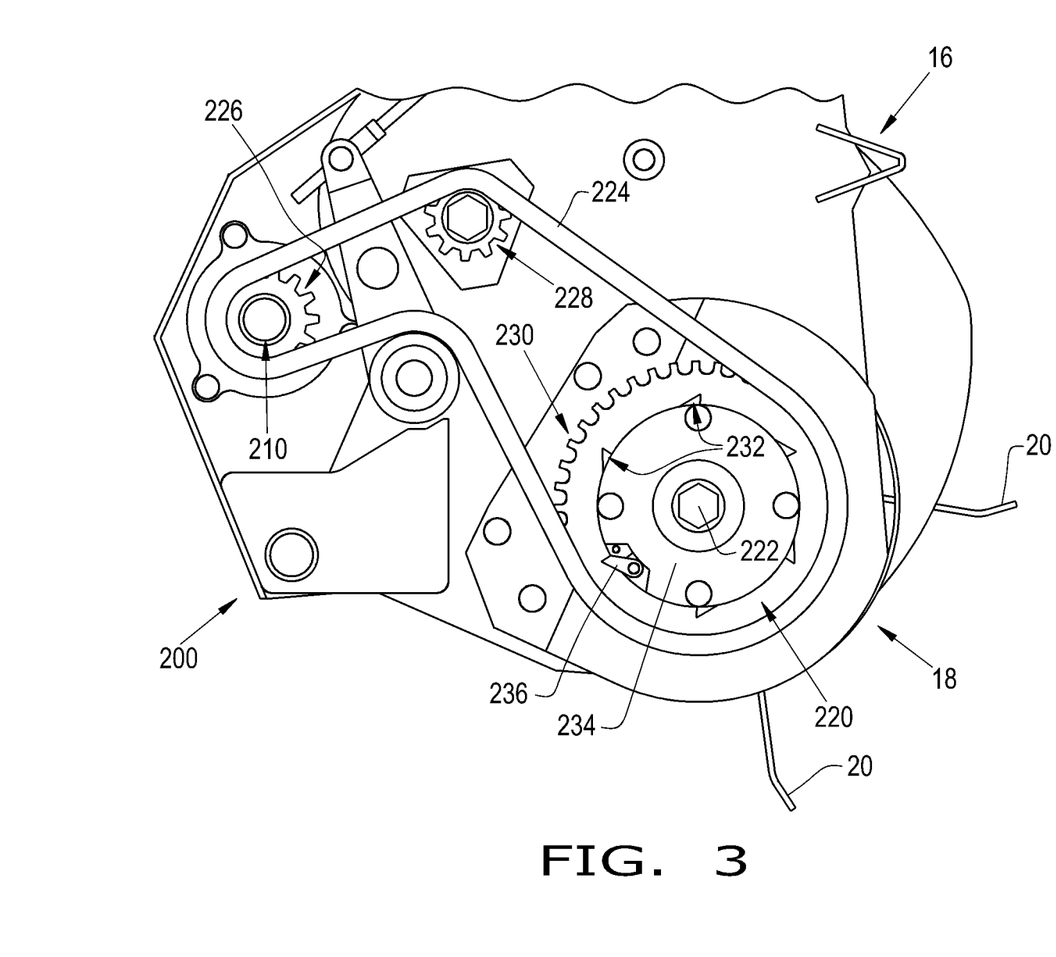
FIG. 3 illustrates a side view of the drive system of FIG. 2.
Figure 4:
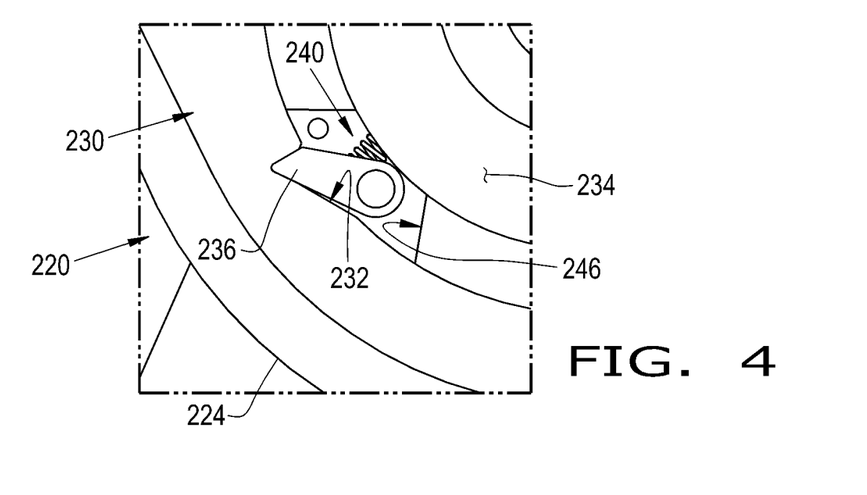
FIG. 4 illustrates a side view of the overrunning clutch of the drive system of FIGS. 2-3.
Figure 5:
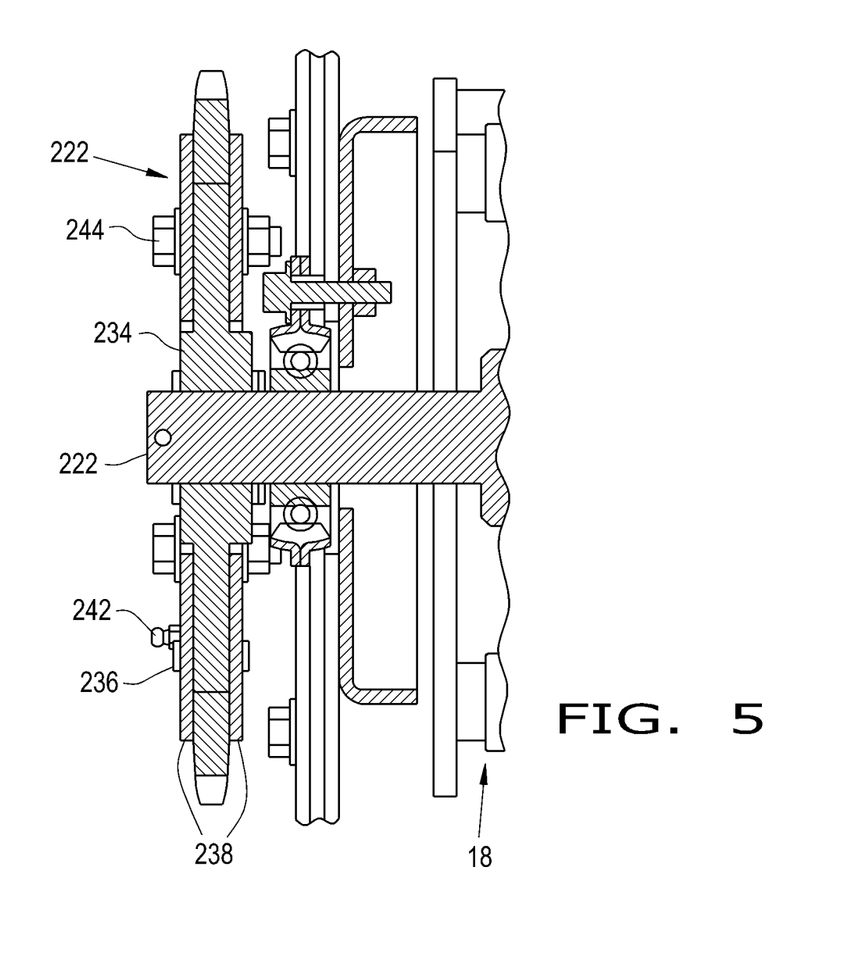
FIG. 5 illustrates a cross-sectional view of the overrunning clutch of the drive system of FIG. 1, taken across line 5-5.

The overrunning clutch 220 is operably connected in between the reel 18 and the drive shaft 210 by the mounting shaft 222 and chain 224, respectively. The overrunning clutch 220 functions to provide one-way driving such that the reel 18 may be rotated in the reverse or forward direction without causing the pickup clutch 216 to re-engage. In more detail, the overrunning clutch 220 prevents movement of the chain 224 so that forward rotation of the reel 18, for example above 80 rpm which could otherwise re-engage the pickup clutch 216, cannot re-engage the pickup clutch 216 since overrunning clutch 220 prevents the chain 224 from transmitting motive power to the pickup clutch 216. The overrunning clutch 220 generally includes a ring sprocket 230 with at least one notch 232, a plate 234, and at least one pawl 236 that is selectively engageable with the one or more notches 232. The overrunning clutch 220 may further include a pair of left and right mounting plates 238, a biasing member 240 connected in between the pawl 236 and the plate 234, a grease nipple 242 for applying grease, and one or more fasteners 244 to couple the mounting plates 238 together, which in turn secures the ring sprocket 230, the plate 234, and the pawl (FIGS. 3-5).

The ring sprocket 230 has an outer toothed perimeter that engages with the chain 224 and an inner perimeter which faces and/or contacts the outer perimeter of the of the plate 234. The internal perimeter also houses the one or more notches 232, which extend the width of the ring sprocket 230. The plate 234 is disposed within and coaxial with the ring sprocket 230. The plate 234 may have at least one cutout 246 for at least partially housing the one or more pawls 236 and allowing the one or more pawls 236 to pivot therein relative to the plate 234 and the ring sprocket 230. Each pawl 236 may be pivotally connected to corresponding receiving holes in the mounting plates 238 (unnumbered). The pawl 236 may have a protruded end for contacting the ring sprocket 230 and a bulbous end with mounting features which pivotally engage with the receiving holes in the mounting plates 238. However, the pawl 236 may be in the form of any desired pawl with any desired shape, size, and material. The biasing member 240 may be in the form of a coil spring 240 that biases the pawl 236 to be extended and positioned within a respective notch 232. Thereby, under typical operating conditions, the biasing member 240 forces the pawl 236 to be engaged with a respective notch 232 so that the plate 234 rotates in unison, or is joined, with the ring sprocket 230. When the reel 18 of the pickup unit 16 becomes rotated in the forward direction, the pawl 236 will slip away from its respective notch 232 so that the ring sprocket 230 and the plate 234 no longer jointly rotate, which thus cuts off motive power to the reel 18.

Figure 6:
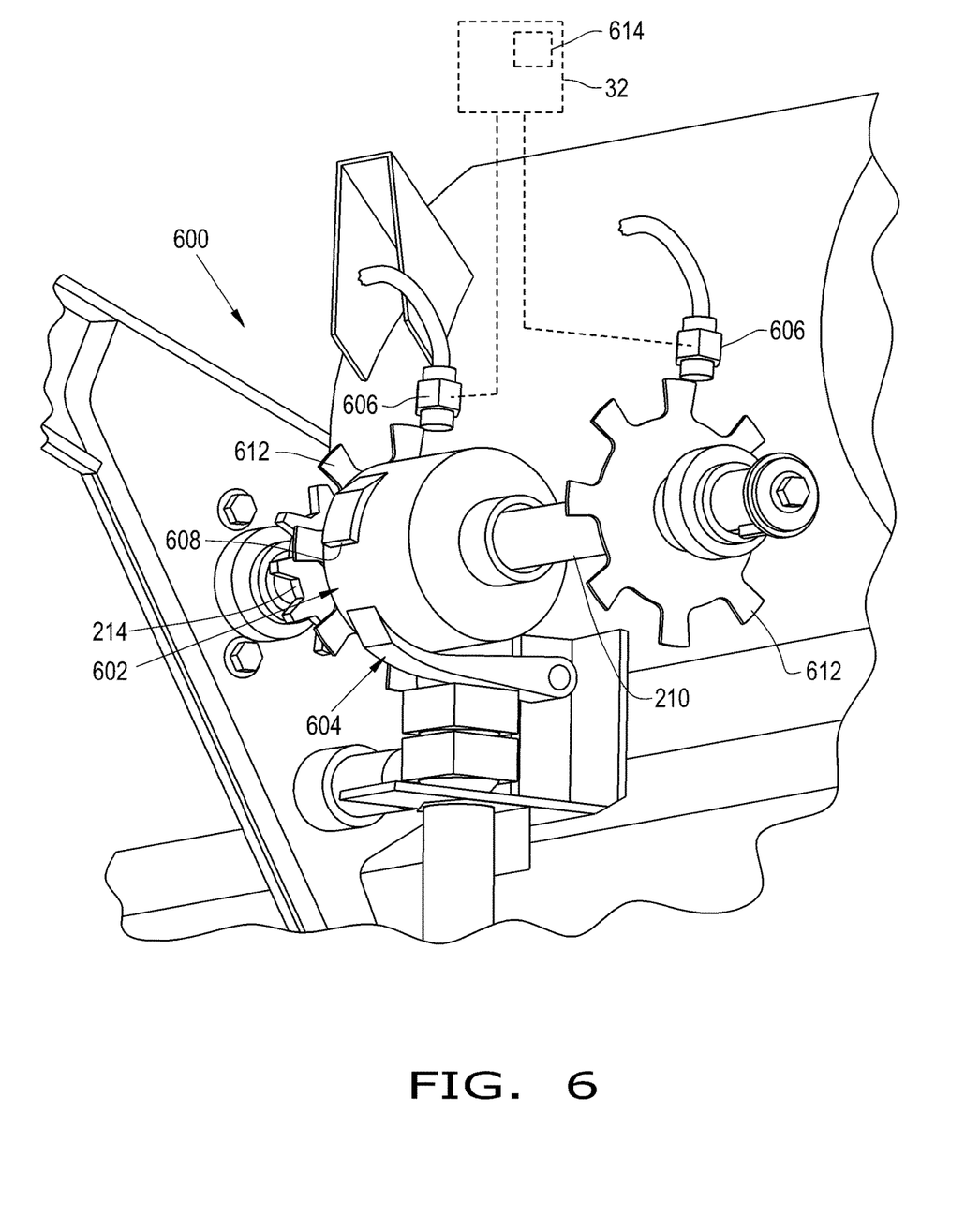
FIG. 6 illustrates a perspective view of another embodiment of a drive system of the pickup unit of the agricultural baler, the drive system includes a single clutch on the pickup unit drive shaft, in accordance with an exemplary embodiment of the present invention.
Figure 7:
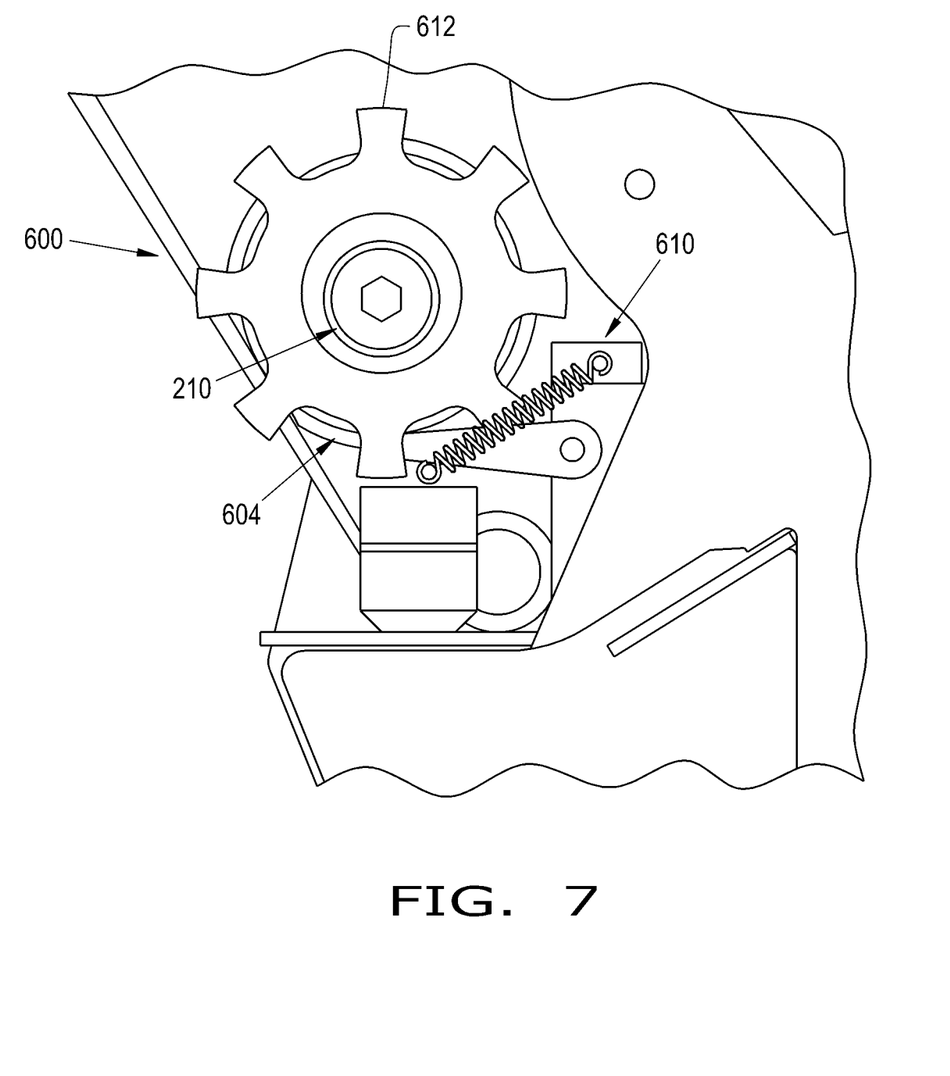
FIG. 7 illustrates a side view of the drive system of FIG. 6.

Referring now to FIGS. 6-7, there is shown another embodiment of a pickup drive system 600 for the pickup unit 16. The drive system 600 may be substantially similar to the drive system 200, as described above, except that the drive system 600 includes a single clutch 602 with a pawl 604 and at least one sensor 606 for measuring the rotational speed and/or torque on the pickup drive shaft 210. The drive system 600 may not include the overrunning clutch 220. The drive system 600 is configured for stopping rotation of the pickup drive shaft 210 upon the pickup unit 16 experiencing an overload by stopping rotation of the clutch 602, via the pawl 604, thus disconnecting the reel 18 from motive power as the PTO shaft 40 remains engaged. Thereby, the operator may manually rotate the reel 18 in either direction without concern of the reel 18 resetting since the drive shaft 210 cannot rotate with the pawl 604 engaged. Like reference characters identify like elements throughout the several views.

The clutch 602 is connected to the drive shaft 210. The clutch 602 may have a rotation side and a nonrotation side. The rotation side of the clutch 602 may have a protrusion 608 for engaging with the pawl 604. It should be appreciated that the protrusion 608 may conversely be in the form of a notch or cutout. Furthermore, the clutch may be in the form of any desired clutch capable of engaging with any desired pawl.

The pawl 604 may be pivotally mounted to a support bracket (unnumbered). An actuator 610 may move the pawl 604 to selectively engage with the protrusion 608 of the clutch 602 (FIG. 7). The pawl 604 may be in the form of an elongated arm; however, the pawl 604 may have any desired size, shape, and material. The actuator 610 may be in the form of an electric or hydraulic motor, a biasing member, and/or an electric, hydraulic, or pneumatic piston. As shown, the actuator 610 is in the form of a servo motor 610 which is operably connected to and controlled by the electrical processing circuit 32.

Each sensor 606 is associated with and mounted adjacent to the drive shaft 210. Each sensor 606 is also operably connected to the electrical processing circuit 32. The one or more sensors 606 may be in the form of a speed sensor and/or a load sensor for indirectly or directly measuring the torque on the drive shaft 210 which is indicative of the loading of the pickup unit 16. In the present exemplary embodiment, each sensor 606 is an optical speed sensor 606 for measuring the speed of the drive shaft 210; and more particularly, a respective target 612, for example a notched disc, mounted on the drive shaft 210. However, it should be appreciated that the one or more speed sensors may be in the form of any desired sensors. As shown, the pickup unit 16 includes two speed sensors 606 respectively mounted at two different locations, which are axially spaced apart relative to the drive shaft 210, for measuring a shaft twist of the drive shaft 210. The torque of the drive shaft 210 is then derivable from the measured shaft twist. For instance, the speed sensors 606 may measure changes in the phase relationship between the two targets 612, and the electrical processing circuit 32 may then measure the phase changes and calculate the torque through the drive shaft 210. The shaft twist may be between 3-10 degrees at maximum engine torque.

According to an aspect of the drive system 600, when the pickup unit 16 is overloaded, the sensors 606 will register that the drive shaft 210 is under an overloaded torque. Accordingly, the electrical processing circuit 32 may automatically control the actuator 610 to engage the pawl 604 and shut down the drive shaft 210 and/or notify the operator, via an indicator light or user interface. In this regard, the electrical processing circuit 32 may shut down the drive shaft 210 automatically or upon receiving an input command from the operator. The electrical processing circuit 32 may keep the drive shaft 210 shut down until the operator inputs a corresponding reset command so that the pickup unit 16 only restarts upon manual intervention by the operator.

It is to be understood that the operation of the drive system 600 may be performed by the electrical processing circuit 32, for example a controller 32, upon loading and executing software code or instructions which are tangibly stored on a tangible computer readable medium 614, such as on a magnetic medium, e.g., a computer hard drive, an optical medium, e.g., an optical disc, solid-state memory, e.g., flash memory, or other storage media known in the art. Thus, any of the functionality performed by the controller 32 described herein is implemented in software code or instructions which are tangibly stored on a tangible computer readable medium. The controller 32 loads the software code or instructions via a direct interface with the computer readable medium or via a wired and/or wireless network. Upon loading and executing such software code or instructions by the controller 32, the controller 32 may perform any of the functionality of the controller 32 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A pickup unit of an agricultural baler, comprising:
a reel with a plurality of tines configured for lifting a crop material from a field, and the reel is rotatable in an operating direction and a reverse direction; and
a drive system configured for driving the reel, comprising:
a gearbox configured for engaging with and receiving motive power from a power take off (PTO) shaft of a towing vehicle for the agricultural baler;
a drive shaft operably connected to the gearbox and the reel; and
a first clutch connected to the drive shaft and configured for operably disconnecting motive power to the reel so that the reel is manually rotatable as the PTO shaft remains operably engaged with the gearbox.

2. The pickup unit of claim 1, wherein the first clutch is a cutout pickup up clutch configured for operably disconnecting motive power to the reel upon an overloading of the pickup unit.

3. The pickup unit of claim 2, wherein the first clutch is configured for lowering a re-engagement speed to be below an idle speed of the PTO shaft.

4. The pickup unit of claim 2, wherein the drive system further comprises a second clutch in the form of an overrunning clutch that is operably connected in between the reel and the drive shaft, and the overrunning clutch is configured for allowing motive power to flow in only one direction such that the reel is manually rotatable in the operating direction without causing a re-engagement of the reel such that the reel is manually rotatable in the operating and reverse directions without re-engaging the first clutch and resetting the reel.

5. The pickup unit of claim 4, wherein the drive system further comprises a first conveying member operably connecting the gearbox and the drive shaft, and a second conveying member operably connecting the overrunning clutch and the drive shaft.

6. The pickup unit of claim 5, wherein the overrunning clutch comprises a ring sprocket engaging with the second conveying member and comprising at least one notch, a plate disposed within and coaxial with the ring sprocket, and at least one pawl pivotable relative to the ring sprocket and selectively engageable with the at least one notch of the ring sprocket.

7. The pickup unit of claim 6, wherein the overrunning clutch further comprises a biasing member connected in between the pawl and the plate and configured for biasing the at least one pawl within the at least one notch of the ring sprocket.

8. The pickup unit of claim 1, wherein the first clutch comprises a pawl that is configured for selectively stopping the clutch and operably disconnecting motive power to the reel upon an overloading of the pickup unit so that the reel is manually rotatable in the operating direction and the reverse direction.

9. The pickup unit of claim 8, further comprising at least one sensor associated with the drive shaft, and wherein the at least one sensor is configured for measuring a torque of the drive shaft which is indicative of a loading of the pickup unit.

10. The pickup unit of claim 9, wherein the at least one sensor comprises a first sensor associated with the drive shaft at a first location and a second sensor associated with the drive shaft at a second location which is, relative to the drive shaft, axially spaced apart from the first location, and wherein the first sensor and the second sensor are configured for measuring a shaft twist of the drive shaft such that the torque of the drive shaft is derivable therefrom.

11. An agricultural baler, comprising:
a frame;
a main bale chamber supported by the frame and configured for forming a bale; and
a pickup unit located upstream of the main bale chamber and comprising a reel with a plurality of tines configured for lifting a crop material from a field, the reel is rotatable in an operating direction and a reverse direction, and a drive system configured for driving the reel, the drive system comprising:
  a gearbox configured for engaging with and receiving motive power from a power take off (PTO) shaft of a towing vehicle for the agricultural baler;
  a drive shaft operably connected to the gearbox; and
  a first clutch connected to the drive shaft and configured for operably disconnecting motive power to the reel so that the reel is manually rotatable as the PTO shaft remains operably engaged with the gearbox.

12. The agricultural baler of claim 11, wherein the first clutch is a cutout pickup up clutch configured for operably disconnecting motive power to the reel upon an overloading of the pickup unit.

13. The agricultural baler of claim 12, wherein the first clutch is configured for lowering a re-engagement speed to be below an idle speed of the PTO shaft.

14. The agricultural baler of claim 12, wherein the drive system further comprises a second clutch in the form of an overrunning clutch that is operably connected in between the reel and the drive shaft, and the overrunning clutch is configured for allowing motive power to flow in only one direction such that the reel is manually rotatable in the operating direction without causing a re-engagement of the reel such that the reel is manually rotatable in the operating and reverse directions without re-engaging the first clutch and resetting the reel.

15. The agricultural baler of claim 14, wherein the drive system further comprises a first conveying member operably connecting the gearbox and the drive shaft, and a second conveying member operably connecting the overrunning clutch and the drive shaft.

16. The agricultural baler of claim 15, wherein the overrunning clutch comprises a ring sprocket engaging with the second conveying member and comprising at least one notch, a plate disposed within and coaxial with the ring sprocket, and at least one pawl pivotable relative to the ring sprocket and selectively engageable with the at least one notch of the ring sprocket.

17. The agricultural baler of claim 16, wherein the overrunning clutch further comprises a biasing member connected in between the pawl and the plate and configured for biasing the at least one pawl within the at least one notch of the ring sprocket.

18. The agricultural baler of claim 11, wherein the first clutch comprises a pawl that is configured for selectively stopping the clutch and operably disconnecting motive power to the reel upon an overloading of the pickup unit so that the reel is manually rotatable in the operating direction and the reverse direction.

19. The agricultural baler of claim 18, wherein the pickup unit further comprises at least one sensor associated with the drive shaft, and wherein the at least one sensor is configured for measuring a torque of the drive shaft which is indicative of a loading of the pickup unit.

20. The agricultural baler of claim 19, wherein the at least one sensor comprises a first sensor associated with the drive shaft at a first location and a second sensor associated with the drive shaft at a second location which is, relative to the drive shaft, axially spaced apart from the first location, and wherein the first sensor and the second sensor are configured for measuring a shaft twist of the drive shaft such that the torque of the drive shaft is derivable therefrom.

* * * * *